United States Patent

[11] 3,608,964

| [72] | Inventor | Thad J. Earl |
| | | 1132 East Second St., Defiance, Ohio 43512 |
| [21] | Appl. No. | 831,380 |
| [22] | Filed | June 9, 1969 |
| [45] | Patented | Sept. 28, 1971 |

[54] PILLOW FOR VEHICLE SEAT
1 Claim, 4 Drawing Figs.

[52] U.S. Cl. .................................................. 297/397, 5/338
[51] Int. Cl. ................................................... A47c 1/10, A47g 9/00
[50] Field of Search .......................................... 297/397, 404, 391–393, 394, 414, 438; 248/118; 24/201; 5/327 B, 325, 377

[56] References Cited
UNITED STATES PATENTS

| 2,522,647 | 9/1950 | Suich | 5/337 X |
| 2,908,766 | 10/1959 | Taylor | 297/391 UX |
| 2,983,310 | 5/1961 | Warlick et al. | 297/399 |
| 3,500,478 | 3/1970 | Foster | 24/201 V |
| 3,063,749 | 11/1962 | Struble et al. | 297/397 UX |

Primary Examiner—Paul R. Gilliam
Attorney—Allen D. Gutchess, Jr.

ABSTRACT: A pillow unit for the head of a passenger in a vehicle seat is attached to the back of the seat and supports the head of the passenger and includes a base member or sheet attached to the seat with a pillow extending outwardly from the back a sufficient distance and at proper angle to support the head in a comfortable position. The base sheet is attached to the seat back by a lower elastic strap and by upper patches of Velcro or similar material which cooperate with other patches of Velcro on the seat back. In a preferred form, the pillow includes a cover and a removable pillow insert which can be removed for cleaning purposes.

PATENTED SEP 28 1971　　　　　　　　　　　　　　　　　　3,608,964
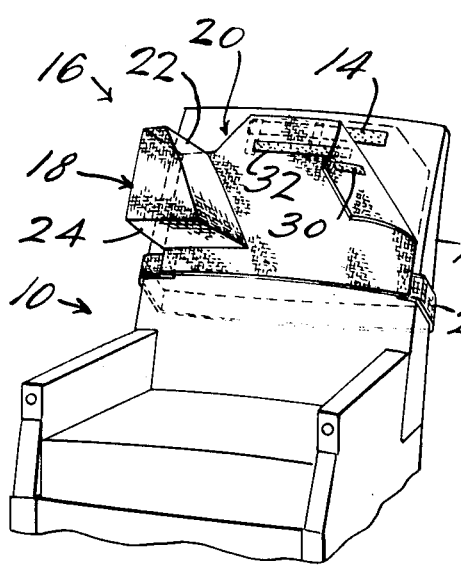
FIG-1-
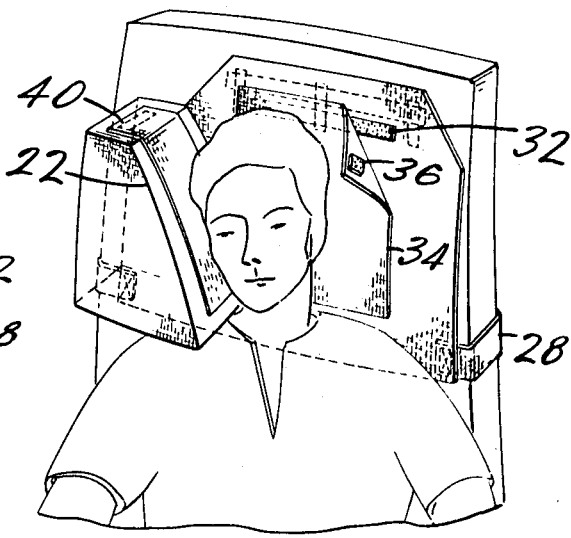
FIG-2-
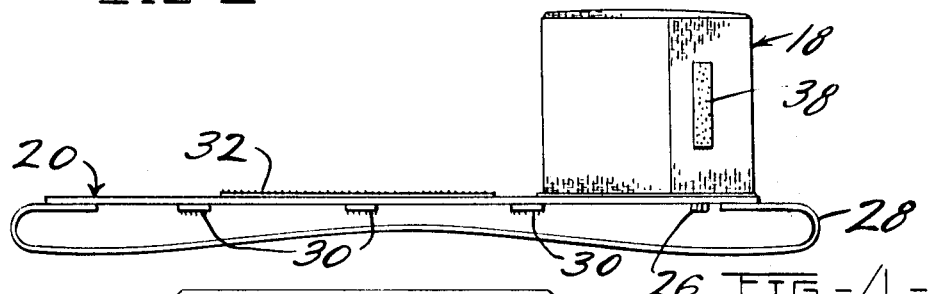
FIG-4-
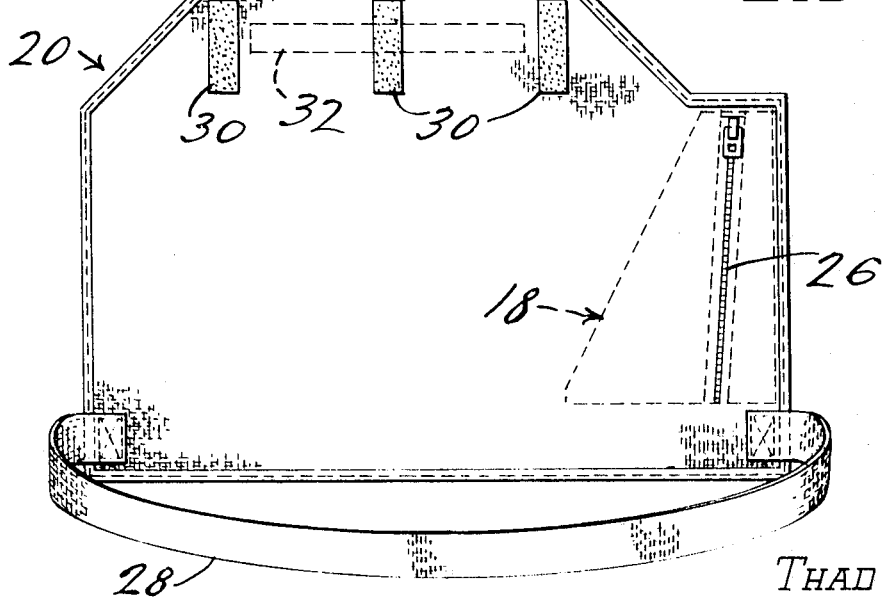
FIG-3-
INVENTOR:
THAD J. EARL.
BY
ATT'YS.

PILLOW FOR VEHICLE SEAT

This invention relates to a pillow unit for use with a seat back particularly for the back of a passenger seat in a vehicle.

Passengers often desire to relax or sleep on vehicles such as automobiles, busses, trains, and airplanes. Particularly on airplanes, where space is more limited, adjustment of the seat backs is also limited. Consequently, it is difficult for most passengers to be able to assume a relaxed position conducive to rest or sleep.

The present invention provides a pillow unit which is quickly and easily removably attached to the back of the seat of a vehicle. The pillow unit includes a pillow which is affixed to a base sheet. The base sheet has a lower flexible and preferably elastic strap connected therewith to extend around the back of the seat and hold the base sheet thereagainst. The base sheet also has connecting patches such as Velcro affixed along the upper edge of the back of the base sheet, which are designed to cooperate with other connecting patches, such as Velcro, affixed to the seat back. The latter patches are often employed, particularly on commercial aircraft, anyway to affix a protective cover to the seat back, so that no additional means are needed to modify the back of the seat to receive the pillow unit.

The pillow unit includes a pillow which is of a generally trapezoid shape as taken in vertical cross section generally parallel to the seat back. This shape provides an angular supporting surface for the head which more fully contacts and supports the side of the head and the cheek of the passenger and also forms a lower corner which fits comfortably between the shoulder and cheek, adjacent the neck. The pillow is held in a fixed position by the supporting base sheet when attached to the seat back to fully support the head of the passenger.

It is, therefore, a principal object of the invention to provide a pillow unit for supporting the head of a passenger seated in a vehicle.

Another object of the invention is to provide a pillow unit with a base-supporting sheet which can be more easily attached to and removed from the back of a seat.

Still another object of the invention is to provide a pillow unit with an improved base sheet having a flexible strap at a lower portion and a connecting patch at an upper portion to affix the base sheet securely to the seat back.

Other objects and advantages of the invention will be apparent from the following detailed description of a preferred embodiment thereof, reference being made to the accompanying drawings, in which:

FIG. 1 is a fragmentary view of a vehicle seat with a pillow unit according to the invention attached thereto;

FIG. 2 is an enlarged, fragmentary view in perspective of the seat back, pillow unit, and a passenger in a relaxed position;

FIG. 3 is a back view in elevation of the pillow unit; and

FIG. 4 is a top view of the pillow unit of FIG. 3.

Referring to FIG. 1, a vehicle seat 10 is of a general type commonly found in aircraft or interstate busses, by way of example. The seat 10 includes an adjustable seat back 12 which can be placed in a reclining position but only to a limited extent in most instances because of space limitations. Consequently, it is difficult for a passenger to assume a relaxed position conducive to sleeping. The seat back 12 commonly is equipped with a connecting patch or strip 14 of Velcro or other suitable material at an upper portion thereof for the purpose of attachment of a protective head sheet or doily, not shown. Such a sheet protects the seat back against soiling and substantially prolongs the period between cleaning operations.

A pillow unit 16 embodying the invention is attached to the seat back 12 and supports the head of a passenger, as shown in FIG. 2, so that the passenger can sleep or at least more fully relax. The pillow unit 16 basically includes a pillow 18 and a base sheet or member 20 which attaches the pillow 18 to the seat back 12 in a predetermined, fixed position so that the pillow, in turn, can effectively support the passenger's head.

The pillow 18 is positioned relative to the back 12 to one side of the center and generally at the level of the head of the passenger in the seat. The pillow 18 preferably is of a generally trapezoid shape or truncated, trapezoid shape, as viewed in a cross section taken in a generally vertical plane parallel to the back of the seat. The pillow thereby forms an angular head-supporting surface 22 and a lower flat surface 24 which meet at an acute angle and at an edge which can be received comfortably between the shoulder and cheek of the passenger, as shown in FIG. 2.

The surface 22 of the pillow extends generally perpendicularly outwardly from the base member 20 and the seat back 12 but can be at an angle as little as 45° and still provide an effective head support. The preferred angle of the surface relative to the seat back, however, is between 60° and 90°. The surface 22 also preferably is at an angle to the plane of the bottom 24, or the horizontal, of about 45° to 75° to comfortably yet fully support the head at a proper angle.

The area of the head-supporting surface 22 is approximately the same as the area of the profile of an average person's head. The height of the surface is from about 8 to 12 inches, approximating the distance from the chin to the top of the head, and the width of the surface is from about 4 to 7 inches, approximating the distance from the forehead to the occipital area of the head. A smaller area of the surface 22 will be too concentrated and uncomfortable while a larger area than that noted above adds nothing to the effective support and also tends to obstruct side vision of the passenger. Such an excessive size also increases the cost of the pillow and the storage space required, which is particularly important on aircraft and busses but also on trains and automobiles.

The area of the base of the pillow 18 affixed to the base sheet 20 also is of importance from the standpoint that it must be sufficiently wide to provide reasonably rigid support for the pillow with respect to the seat back. For this purpose, the base of the pillow should have an average width at least about equal to the width of the surface 22 or, in other words, the distance which the surface 22 projects from the base 20. The overall pillow size preferably is such that the surface 22 will be located to one side of the center of the seat back 12, with the overall pillow not extending beyond the edge of the seat back.

The pillow 16 preferably includes a removable pillow insert which can be removed through a zippered opening 26 (FIG. 3). This enables the pillow unit to be more easily cleaned as is necessary occasionally.

In accordance with the invention, the base sheet 20 is provided with an inexpensive and yet effective means for being attached to the back 12. Accordingly, the lower corners of the base sheet 20 have an elastic strap 28 affixed thereto which is of a length sufficient to extend around the seat back when stretched somewhat to hold the lower portion of the base sheet 20 firmly against the seat back. However, connecting patches, such as Velcro, can be used at the lower portions of the base sheet 20 in place of the strap 28.

At the upper edge of the base sheet 20, on the back thereof, are several, in this case three, connecting patches 30 which can be of Velcro or other suitably connecting material which cooperate with the strip or patch 14 to hold the upper portion of the base sheet 20 firmly against the seat back 12. The patch 14 normally contains the male portion of the Velcro material, in the form of small barbs or hooks. In such an instance, the patches 30 will be the female portion of the Velcro, in the form of looped piles which are engaged or caught by the barbs when pressed thereagainst. Since the connecting patch 14 is already on the seat back 12 to attach the head cover, no modification whatsoever is required for the passenger seat 10 to hold the base sheet 20 and the pillow 18 in position.

As shown in FIG. 3, the patches 30 extend vertically preferably for a length of several inches, In this manner, the base sheet 20 can be positioned at adjustable, vertical positions relative to the seat back 12 to accommodate passengers of different heights. Further, the base sheet 20 can be adjusted transversely to some extent so as to vary the distance the pillow 18 is spaced from the center of the seat back 12.

To assemble the pillow unit 16 with the seat back 12, the strap 28 is simply stretched slightly and slipped over the seat back to the desired position, at which time the connecting patches 30 are pressed against the strip 14. Consequently, the attachment is simple and fast yet requires no modifications to the seat. Further, no rigid connections of any type are needed which also would present storage problems for the pillow unit.

Particularly where the pillow unit is used in smaller or compact automobiles, with the base or supporting member 20 being reduced in size, the flexible strap 28 alone can be used to attach the pillow unit to the seat back. In this instance, the strap is employed at a central portion rather than the lower portion of the base member. If the automobile seat back tends to be hard, the base member 20 can be padded to increase comfort.

On the front surface of the base sheet 20 is a connecting patch or strip 32 which is used to attach a head cover or doily 34 through connecting patches 36, to protect the base sheet 20 and reduce the need for cleaning. Further, a small connecting patch 38 (FIG. 4) is affixed to the top of the pillow 18 to receive a face cover or doily 40 to provide protection for the surface 22 of the pillow 18. In this instance when the patches 32 and 38 are of Velcro, they preferably are the hook or male portions, with the looped pile or female portions affixed to the covers 34 and 40, whereby the covers 34 and 40 can be more readily washed and handled.

Various modifications of the above described embodiment of the invention will be apparent to those skilled in the art and it is to be understood that such modifications can be made without departing from the scope of the invention, the embodiment shown and described being primarily for purposes of illustration and not limitation.

I claim:

1. In combination, a pillow unit and a vehicle seat, said seat having a back and a connecting patch at an upper portion thereof normally to receive a protective head cover, said pillow unit comprising a base member, a pillow affixed to said base member and being of a size sufficient to support the head of a passenger, said pillow being of a generally trapezoid shape taken in a plane generally parallel to the base member, said pillow having a head-supporting surface which extends substantially perpendicularly to the base member, and means connected to said base member removably attaching said base member to said seat back to position said pillow to one side of the center of said seat back and at the level of the passenger's head, said attaching means comprising an elongate resilient member attached to said base member and extending around the seat back to hold a lower portion of the base member against the seat back, at least one connecting patch affixed to an upper portion of said base member and cooperating with said seat back patch to aid in holding said base member in a fixed position relative to said seat back, said base member patch being of a size sufficient to enable adjustment of said base member vertically relative to said seat back, one of said connecting patch and said mating patch constituting a multiplicity of looped piles and the other of said connecting patch and said mating patch constituting a multiplicity of barbs adapted to engage said looped piles and a horizontally extending connecting patch located on the front of said base member near the upper portion thereof to attach a removable cover to said base member adjacent said pillow, and an additional connecting patch on an upper portion of said pillow to attach a face sheet over said head-supporting surface.